United States Patent

Tanaka et al.

[19]

[11] Patent Number: 4,549,201

[45] Date of Patent: Oct. 22, 1985

[54] CIRCUIT ARRANGEMENT FOR DIGITIZING AND STORING COLOR VIDEO SIGNAL

[75] Inventors: Hideshi Tanaka; Hisanori Tsumiyama, both of Yokohama; Yoshio Mizuno, Kamakura; Terumi Ohara, Yokohama; Toshinori Takahashi, Kawasaki; Shigeru Kato, Tokyo; Tsutomu Kiuchi, Yokohama, all of Japan

[73] Assignee: Victor Company of Japan, Limited, Japan

[21] Appl. No.: 546,538

[22] Filed: Oct. 28, 1983

[51] Int. Cl.[4] .............................................. H04N 9/32
[52] U.S. Cl. ....................................... 358/13; 358/310; 360/33.1
[58] Field of Search ................. 358/13, 310, 312, 330, 358/334; 360/33.1, 32

[56] References Cited

U.S. PATENT DOCUMENTS 3,921,203  11/1975  Okey ........................... 358/334
3,946,431   3/1976  Gantert ........................ 358/334
4,376,948   3/1983  Dischert et al. ............... 358/13

FOREIGN PATENT DOCUMENTS 58-24286  2/1983  Japan ........................... 358/13

OTHER PUBLICATIONS

I. G. Brown, Primary Signal Component Coding, 1980 International Broadcasting Convention Conference Publication 191, pp. 344–349.

*Primary Examiner*—John W. Shepperd
*Attorney, Agent, or Firm*—Lowe, King, Price & Becker

[57] ABSTRACT

An input composite color video signal is processed to derive a luminance signal and three primary color signals first, and then only a high frequency component of the luminance signal is A/D converted by a first A/D converter, while only low frequency component of each of the three primary color signals is A/D converted by a second A/D converter with the low frequency component of the three primary color signals being time-shared by a first switching circuit to be a single analog signal. The A/D converted chrominance information is fed to a second switching circuit comprising shift registers of parallel-in and serial-out type so that three bits respectively indicative of red, green and blue signals are simultaneously outputted therefrom. The A/D converted luminance data of a plurality of bits, and three bits indicative of three primary colors are simultaneously written into a memory.

6 Claims, 7 Drawing Figures

FIG. 1A
PRIOR ART
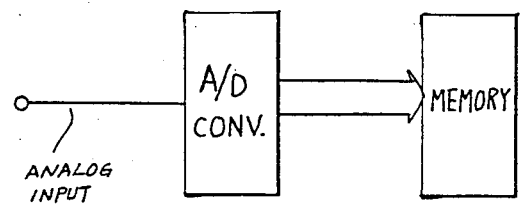
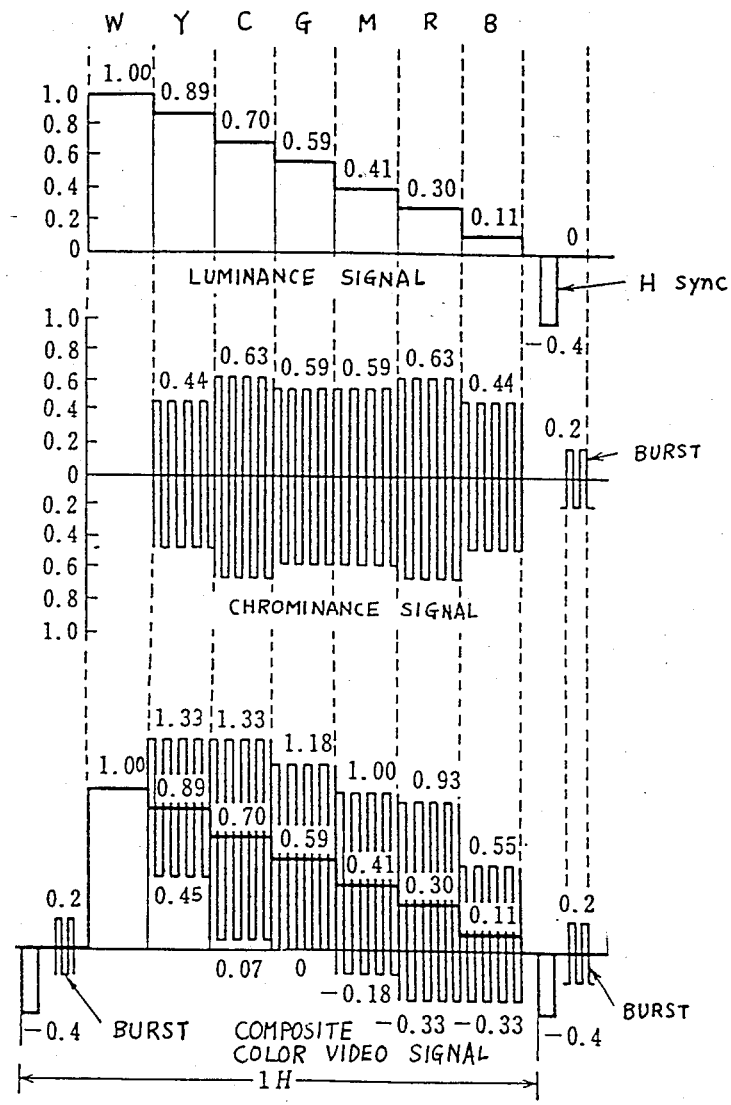
FIG. 1B

CIRCUIT ARRANGEMENT FOR DIGITIZING AND STORING COLOR VIDEO SIGNAL

BACKGROUND OF THE INVENTION

This invention relates generally to circuitry for digitizing color video signal, and then recording or storing digitized color video signal into a memory, and more particularly, the present invention relates to such a circuit useful in digital TV receiving systems, color printing systems, still picture display TV systems or the like.

Recently, color video signals used in conventional TV systems are sometimes digitally processed to be stored in a memory so that complex signal processing is allowed to obtain various kinds of reproduced pictures on a CRT or printing sheets. In a known digital system in which a color video signal, such as a composite color video signal in NTSC system, is digitized, the input composite color signal is applied to an A/D (anlog-to-digital) converter to derive digital data which will be stored in a memory. However, since the analog input including luminance and chrominance information is simultaneously converted into a digital signal by way of a single A/D converter, a relatively large number of output digital data bits is required to ensure accurate quantization.

Furthermore, in other known ditalizing system, an input composite color video signal is divided into Y, I, Q signals by way of a decoder, and then these Y, I, Q signals are used to derive three primay color signals R, G, B by way of a matrix. Then these R, G, B signals are respectively converted into digital signals by way of three different A/D converters. However, this conventional system requires three different A/D converter, while digital processing has to be effected separately for each of the three primary color signals.

SUMMARY OF THE INVENTION

The present invention has been developed in order to remove the above-described drawbacks inherent to the conventional or known digitizing systems for composite color video signals.

It is, therefore, an object of the present invention to provide a new and useful circuit arrangement for accurately digitizing color video signals with A/D converters of less bit numbers.

According to a feature of the present invention an input composite color video signal is processed to derive a luminance signal and three primary color signals first, and then only a high frequency component of the luminance signal is A/D converted, while only low frequency component of each of the three primary color signals is A/D converted with the low frequency component of the three primary color signals being time-shared to be a single analog signal. The A/D converted chrominance information is fed to shift registers of parallel-in and serial-out type so that three bits respectively indicative of red, green and blue signals are simultaneously outputted therefrom. The A/D converted luminance data of a plurality of bits, and three bits indicative of three primary colors are simultaneously written into a memroy.

In accordance with the present invention there is provided a circuit arrangement for digitizing a color video signal and for storing digitized data, comprising: means responsive to the color video signal for producing a frequency-limited luminance signal whose frequency is higher than a first cut-off frequency and lower than a second cut-off frequency which is higher than the first cut-off frequency, and three frequency-limited chrominance signals whose frequency is lower than the first cut-off frequency; a first analog-to-digital converter responsive to the frequency-limited luminance signal for producing luminance digital data by using a first sampling signal having a first sampling frequency; a first switching circuit for passing the three frequency-limited chrominance signals one after another at a switching frequency which is substantially three or more times the first cut-off frequency, so as to produce a single time-sharing signal; a second analog-to-digital converter responsive to the time-sharing signal for producing chrominace digital data by using a second sampling signal having a frequency which is three times the switching frequency; a second switching circuit responsive to the chrominance digital data for separating the same into a plurality of color data and for outputting the color data by sending out data bits one after another for each of the color data in response to a clock pulse having the same frequency as that of the first sampling signal; means for producing the first and second sampling signals, a signal for determining the switching frequency, and the clock pulse; and a memory for storing the luminance digital data of a plurality of bits from the first analog-to-digital converter, and the chrominance digital data from the second switching circuit, each bit of the luminance digital data and the chrominance digital data being simultaneously written into the memory in response to the clock pulse.

BRIEF DESCRIPTION OF THE DRAWINGS

The object and features of the present invention will become more readily apparent from the following detailed description of the preferred embodiment taken in conjunction with the accompanying drawings in which:

FIG. 1A is a diagram of a known A/D converting system used for digitizing a composite color video signal;

FIG. 1B is an explanatory diagram of the luminance signal and the chrominance signal both included in the composite color video signal;

The same or corresponding elements and parts are designated at like reference numerals throughout the drawings.

DETAILED DESCRIPTION OF THE INVENTION

Prior to describing the embodiment of the present invention, the above-mentioned conventional or known arrangements will be described with reference to FIGS. 1-4 for a better understanding of the present invention.

FIG. 1A illustrates a conventional A/D converting system used in a digital TV or the like. A composite color video signal to be converted into a digital signal comprises a luminance signal and a chrominance signal as shown in FIG. 1B, and therefore, the amplitude or level of the composite color video signal is such that the maximum is 1.33 and the minimum is −0.33 assuming that the level of white portion is 1.00. As a result, the amplitude range or level width of the composite color video signal is 1.66, which is greater than that of the luminance signal by 0.66. When quantizing such a composite color video signal, an output digital data is apt to suffer from quantization distortion when compared to the case in which only the luminance signal is quantized assuming the number of bits on A/D conversion in both cases is the same. Furthermore, when comparing to the case in which only the chrominance signal is quantized, A/D conversion of the composite color video signal results in an extremely small number of effective digital data bits on quantization of minimum level color portion, i.e. 0.44. For instance, assuming that the bit number of the A/D converter of FIG. 1A is eight, the amplitude range of a color whose chrominance signal level is minimum is approximately one fourth the amplitude range of the composite color video signal as expressed by 0.44/1.66, and therefore the number of effective bits resulted from A/D conversion of such a portion is only six. This means that A/D conversion of such a portion suffers from a quantization noise which is approximately the same as that obtained in a 6-bit A/D converter. Moreover, with the arrangement of FIG. 1A it is necessary to use a sampling frequency having approximately three or more times the maximum frequency of the composite color video signal in order to accurately reproduce the phase of the carrier wave of the chrominance signal. From the above it will be understood that the conventional A/D converting system of FIG. 1A suffers from low bit-usage efficiency which leads to quantization distortion.

Figure 2:
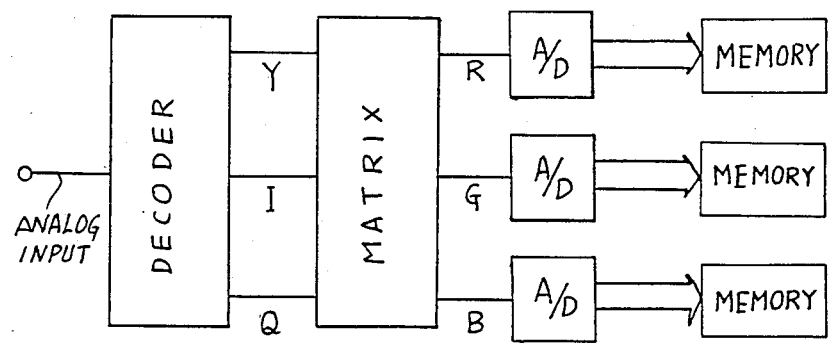
FIG. 2 is a block diagram of another known A/D converting system.

FIG. 2 shows the above-mentioned known A/D converting system in which three A/D converters are employed for respectively quantizing three primary color signals R, G, B obtained through well known decoder and matrix arrangement.

Figure 3:
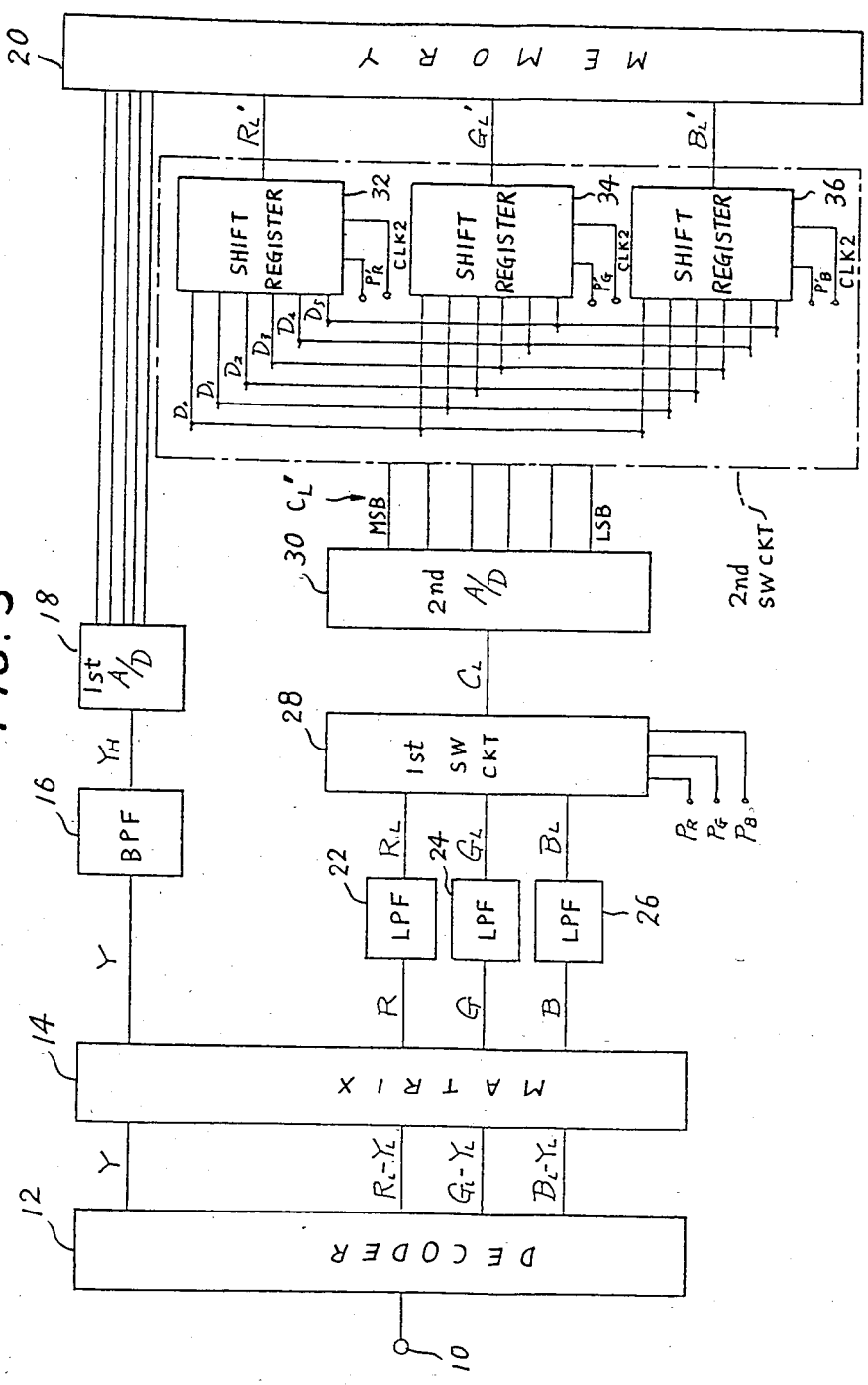
FIG. 3 is a schematic block diagram of an embodiment of an A/D converting system according to the present invention.

Reference is now made to FIG. 3 showing a schematic block diagram of an embodiment of the present invention. The circuitry of FIG. 3 generally comprises a decoder 12, a matrix 14, filters 16, 22, 24 and 26, a first switching circuit 28, first and second A/D convertes 18 and 30, a second switching circuit having three shift registers 32, 34, and 36, and a memory 20. An input terminal 10 is provided to receive a composite color video signal to be digitized. The composite color video signal from the input terminal 10 is fed to the decoder 10 in which a luminance signal Y and three color difference signals $R_L-Y_L$, $G_L-Y_L$ and $B_L-Y_L$ are produced wherein $Y_L$ is a low frequency component of the luminance signal Y. These signals from the decoder 12 are fed to the matrix 14 to ouput the luminance signal Y and three primary color signals R, G and B. Since such a way of decoding and matrixing for obtaining the luminance signal Y and the three primary color signals R, G and B is well known in the art, further description thereof is omitted.

The luminance signal Y from the matrix 14 is fed via the filter 16, which may be a high-pass or band-pass filter as will be described later, to the first A/D converter 18 which quantizes the filtered or frequency-limited luminance signal $Y_H$ (i.e. a high frequency component of the luminance signal Y) by using a sampling signal having a frquency $f_s$, such as 9.2 MHz. Digital output data of 5-bit is fed to the memory 20 to be stored therein. On the other hand, the three primary color signals R, G and B are respectively fed via the filters 22, 24 and 26, which are low-pass filters, to the first switching circuit 28. Filtered low-frequency components of the three primary color signals R, G and B are respectively indicated at the references $R_L$, $G_L$ and $B_L$. The cut-off frequency of the low-pass filters 22, 24 and 26 is set to 0.5 MHz, and therefore, the maximum frequency of these filtered three primary color signals $R_L$, $G_L$ and $B_L$ is 0.5 MHz.

Figure 4:
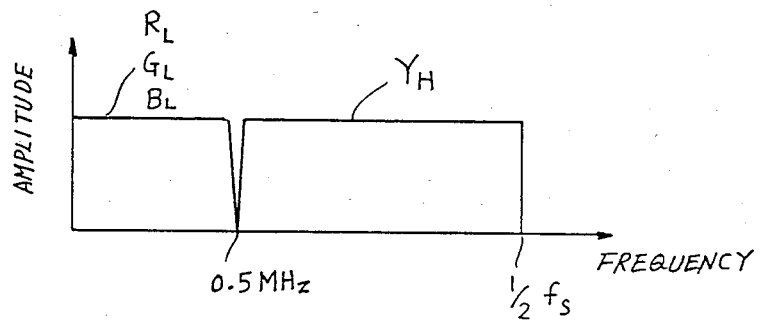
FIG. 4 is an explanatory diagram showing the operation of the system of FIG. 3.

FIG. 4 shows the frequency relationship between the above-mentioned filtered luminance signal $Y_H$ and the filtered chrominance signals $R_L$, $G_L$ and $B_L$. These signals $R_L$, $G_L$ and $B_L$ are switched by the first switching circuit 28 by using three switching signals $P_R$, $P_G$ and $P_B$ each having a frequency $f_t$ which is higher than approximately three times the cut-off frequency of the low-pass filters 22, 24 and 26. Namely, when the cut-off frequency is 0.5 MHz, the frequency $f_t$ is higher than 1.5 MHz. As a result of switching, the first switching circuit 28 outputs a single output $C_L$, which is a time-sharing signal including the filterd three primary color signals $R_L$, $G_L$ and $B_L$ in a given order. The time-sharing signal $C_L$ from the first switching circuit 28 is fed to the second A/D converter 30 to be quantized by using a sampling signal having a frequency which is three times the frequency $f_t$. As a result of A/D conversion by the second A/D converter 30, 6-bit digital data $C_L'$ is obtained. This 6-bit digital data $C_L'$ is fed to parallel inputs of three shift registers 32, 34 and 36 from which serial outputs are derived respectively. In detail, each of the shift register 32, 34, and 36 is responsive to shift-load switching signals $P_R'$, $P_G'$ and $P_B'$ fed to their shift/load terminals S/$\overline{L}$, and to a clock signal CLK2 having the same frequency as that of the sampling signal $f_s$ fed to the first A/D converter 18. As a result of parallel-to-serial conversion in the three shift registers 32, 34 and 36, three serial outputs $R_L'$ $G_L'$ and $B_L'$ respectively corresponding to the three primary colors are obtained, and are then stored in the memory 20.

Figure 5:
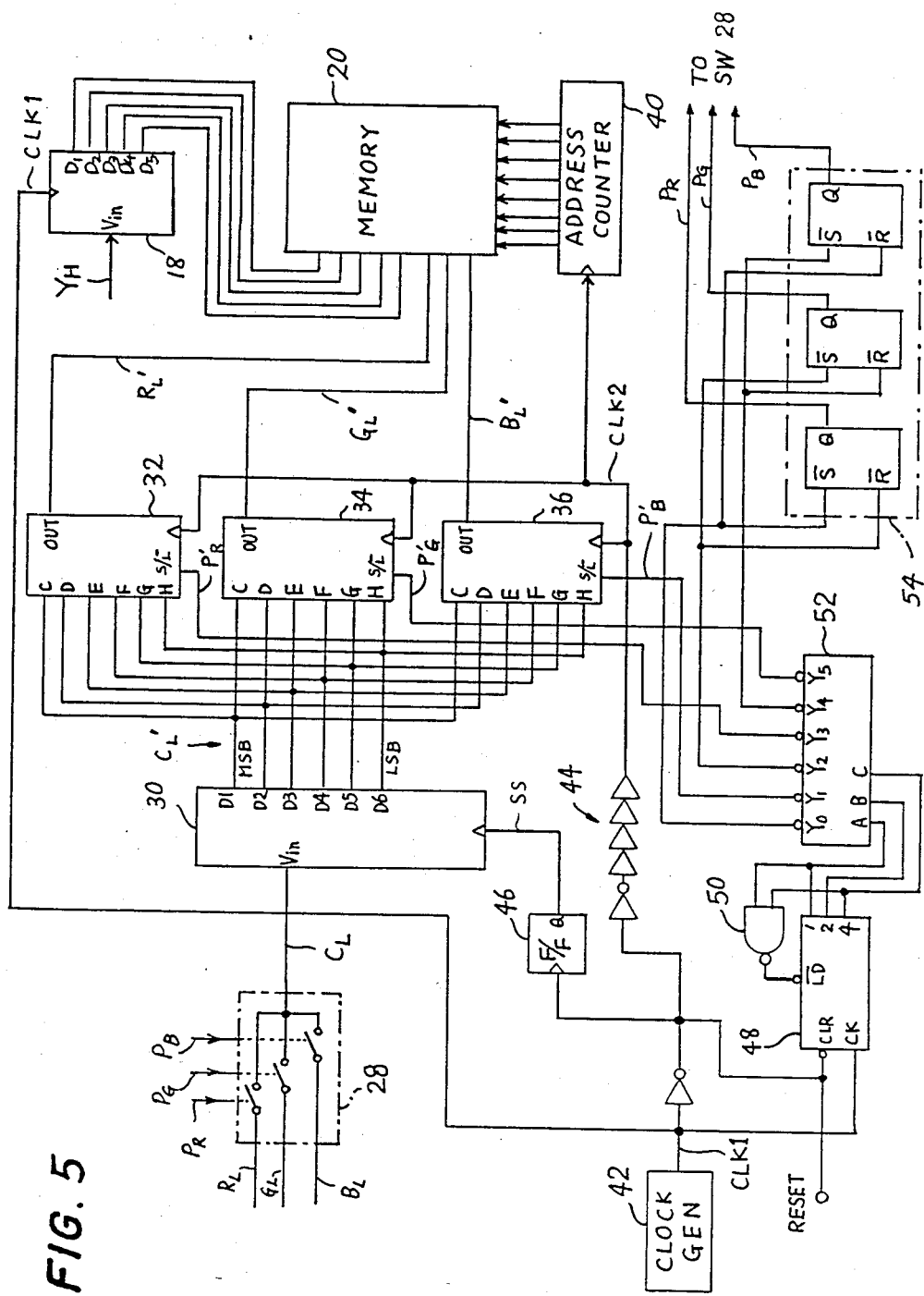
FIG. 5 is a circuit diagram showing a main part of FIG. 3.

FIG. 5 illustrates a circuit diagram showing the first switching circuit 28, the first and second A/D converters 18 and 30, the second switching circuit including the three shift registers 32, 34 and 36, and the memory 20. The first switching circuit 28 may be actualized by an analog switching IC CD4066 manufactured by RCA, while each of the first and second A/D converters 18 and 30 may be actualized by an IC TDC 1014J manufactured by TRW. Furthermore, each of the shift registers 32, 34 and 36 may be actualied by an IC SN54LS166 manufactured by Texas Instruments. As the memory may be used any RAM of the by-8-bit organization whose addresses may be designated by address data from an address counter 40 responsive to a clock signal CLK2. FIG. 5 also shows some other integrated circuits used to produce the switching signals $P_R$, $P_G$ and $P_B$, and sampling signals respectively fed to the first and second A/D converters 18 and 30, the shift-load switching signals $P'_R$, $P'_G$ and $P'_B$, and the above-mentioned clock signal CLK2. In detail, a clock pulse generator 42 is provided to generate a basic clock signal CLK1, which is used as the sampling signal $f_s$ fed to the first A/D converter 18. This basic clock signal CLK1 is retarded by a delay circuit 44 to be used as the above-mentioned clock pulse signal CLK2. Namely, both CLK1 and CLK2 has a frequency of 9.2 MHz in this embodiment. The clock signal CLK2 is also applied to the shift registers 32, 34 and 36 as their clock signals so that parallel input bits are shifted out one after another in response to each pulse of clock CLK2. The basic clock signal CLK1 is frequency-divided by a flip-flop 46 to produce the sampling signal SS of 4.6 MHz applied to the second A/D converter 30. A synchronous 4-bit counter, which may be an IC SN54LS163 of Texas Instruments, a NAND gata 50, a decoder 52, which may be an IC SN54LS138 of Texas Instruments, and a set of S-R latches, which may be an IC SN54LS279 of Texas Instruments, are provided for processing the basic clock signal CLK1 to produce the above-mentioned switching and shift-load switching signals $P_R$, $P_G$, $P_B$, $P'_R$, $P'_G$, and $P'_B$. Although the digital output terminals D1 through D6 of the second A/D converter 30 are shown to be directly connected to parallel input terminals C through H of the three shift registers 32, 34 and 36, a buffer/driver may be interposed therebetween. As such a buffer/driver may be used an IC SN5407 of Texas Instruments. When this IC is used, pull-up resistors are connected between each output of the buffer/driver and a positive power source since the buffer/driver is of open-collector output type.

Figure 6:
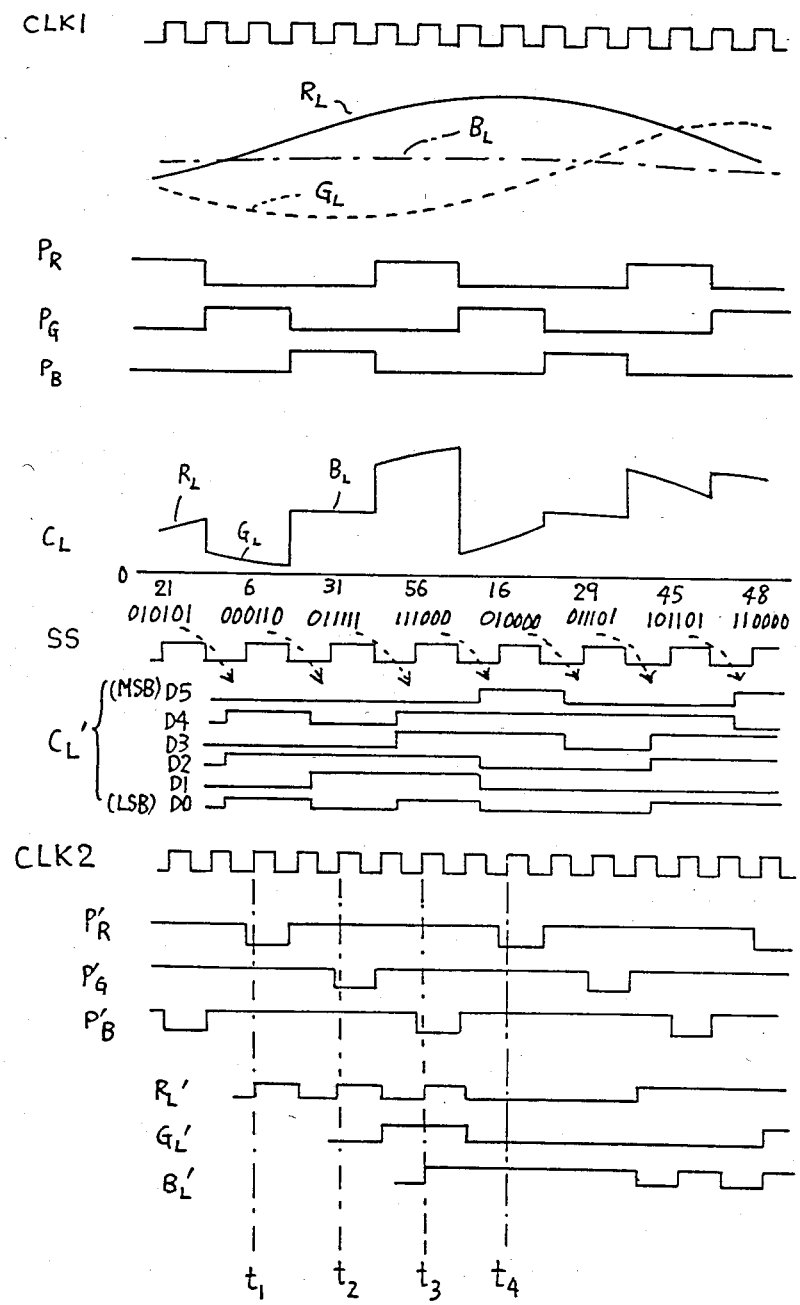
FIG. 6 is a timing chart useful for understanding the operation of the system of FIGS. 3 and 5.

FIG. 6 shows timings and waveforms of various signals used in the arrangement of FIG. 5. Since the first switching circuit 28 selectively passes one of its three input signals $R_L$, $G_L$ and $B_L$ only when each switching signal $P_R$, $P_G$ or $P_B$ is of high level, the filtered three primary color signals $R_L$, $B_L$ and $B_L$ are time-shared to become the single output signal $C_L$. The analog value of the time-sharing signal $C_L$ is sampled periodically by the rising edges of 4.6 MHz clock or sampling signal SS to be converted into digital data. Sampled analog values and their associated digital data are shown below the waveform of the time-sharing signal $C_L$. Because of time lag required in A/D conversion, digital output data is outputted from the second A/D converter at a retarded timing as indicated by arrowed dotted lines. The digital data which represents one of three primary color data at one time, is loaded into a corresponding shift register 32, 34 or 36. For instance, at time $t_1$ in FIG. 6, digital data of 010101 indicative of the filtered color signal of RED is loaded such that all of the six bits are acquired in parallel to the shift register 32 in response to a rising or leading edge of the clock pulse CLK2 which appears when the shift-load switching signal $P'_R$ is of low level. In other words, shift-load switching signals $P'_R$, $P'_G$ and $P'_B$ are used to enable and disable the parallel input terminals of the shift registers 32, 34 and 36. After the data $C_L'$ is loaded into the shift register 32, all the input terminals thereof are disabled. Meanwhile the loaded bits of the data $C_L'$ are outputted one after another from an LSB to an MSB as the bits are shifted within the shift register 32. Since the LSB is outputted immediately after the parallel input data is loaded, all the six bits are shifted out when six pulses of the clock CLK2 are applied to the shift register 32. In this way all six bits are outputted successively to be stored in the memory 20 before time $t_4$. When the serial data bits from the shift register 32 are being written into the memory 20, another shift register 34 loads data of the GREEN signal at time $t_2$, and then another shift register 36 loads data of BLUE signal at time $t_3$, and these shift registers 34 and 36 operate in the same manner as the shift register 32 so that their output serial data is stored in the memory 20.

From the above it will be understood that 5-bit luminance signal data and 3-bit chrominance signal data are written into the memory 20 simutaneously. Therefore, the stored digital data may be readily processed thereafter. In the above-embodiment, the original luminance signal Y and the original three primary color signals R, B and B are respectively filtered as shown in FIG. 4. This point will be described in detail hereafter. In NTSC system for instance, decoder outputs generally have forms of color difference signals R-Y, G-Y and B-Y, and when such a color difference signal system is employed, no substantial problem occurs in practice, in constrast with I, Q system, even if color reproducing frequency is limited to be less than 0.5 MHz. Therefore, when the composite color video signal is processed by the decoder 12 and the matrix 14 as shown in FIG. 3 to produce the three primary color signals R, G and B, the following formulas are satisfied:

$$R = R_L - Y_L + (Y_L + Y_H) = R_L + Y_H$$

$$G = G_L - Y_L + (Y_L + Y_H) = G_L + Y_H$$

$$B = B_L - Y_L + (Y_L + Y_H) = G_L + Y_H$$

wherein $R_L - Y_L$, $G_L - Y_L$ and $B_L - Y_L$ are color difference signals whose frequency range is limited by 0.5 MHz; $Y_L$ is a frequency component below 0.5 MHz of the luminance signal; $Y_H$ is a frequency component above 0.5 MHz of the luminance signal; and $Y_L + Y_H$ is the luminance signal.

Therefore, when the chrominance signals R, G and B are passed through respective low-pass filters 22, 24 and 26 whose cut-off frequency is 0.5 MHz, the high frequency component $Y_H$ is removed. Namely, the filterd three primary color signals $R_L$, $G_L$ and $B_L$ include only low frequency components. As a result, the chrominance information may be derived by using a low frequency sampling signal and less number of bits, which is smaller than that in conventional arrangement by 2 or so, if A/D conversion quality is set to the same as in conventional arrangement.

On the other hand, when the luminance signal Y is passed through the filter 16, which blocks frequency components below 0.5 MHz, the output filtered signal includes only the high frequency component $Y_H$. It is known statistically that the level of high frequency component $Y_H$ is lower than that of low frequency component $Y_L$, and therefore this is advantageous when converting the high frequency component $Y_H$ into a digital signal because the number of bits on A/D conversion may be reduced. Namely, the number of bits for A/D conversion of the luminance information may be smaller than the number of bits for A/D conversion of the chrominance information by 1 or more.

It will be understood from the above formulas that in order to reproduce the three primary color signals R, G and B by using the digitized and stored luminance and chrominance data, only a single adder may be needed to add the high frequency component $Y_H$ to the signals $R_L$, $G_L$ and $B_L$ where these signals $Y_H$, $R_L$, $G_L$ and $B_L$ may be produced from the stored data from the memory 20 by processing the same in a manner opposite to the way of processing of FIG. 3.

In the above-described embodiment of FIG. 3, the filter 16 is required to block low frequency component $Y_L$, and therefore a high-pass filter or a band-pass filter is needed. Since it is preferable to avoid aliasing noises, which are apt to occur on A/D conversion, the maximum frequency is preferably set to a value below one half the sampling frequency $f_s$. To this end a band-pass filter whose pass band is between 0.5 MHz and approximately one half the sampling frequency fs is preferably used as the filter 16. In the embodiment, the sampling frequency $f_s$ is 9.2 MHz, and therefore the pass-band of the band-pass filter 16 may have a range between 0.5 and 4.6 MHz.

The above-described embodiment is just an example of the present invention, and therefore, it will be apparent for those skilled in the art that many modifications and variations may be made without departing from the spirit of the present invention.

What is claimed is:

1. A circuit arrangement for digitizing a color video signal and for storing digitized data, comprising:
   (a) means responsive to said color video signal for producing a frequency-limited luminance signal whose frequency is higher than a first cut-off frequency and lower than a second cut-off frequency which is higher than said first cut-off frequency, and three frequency-limited chrominance signals whose frequency is lower than said first cut-off frequency;
   (b) a first analog-to-digital converter responsive to said frequency-limited luminance signal for producing luminance digital data by using a first sampling signal having a first sampling frequency;
   (c) a first switching circuit for passing said three frequency-limited chrominance signals one after another at a switching frequency which is substantially three or more times said first cut-off frequency, so as to produce a single time-sharing signal;
   (d) a second analog-to-digital converter responsive to said time-sharing signal for producing chrominace digital data by using a second sampling signal having a frequency which is three times said switching frequency;
   (e) a second switching circuit responsive to said chrominance digital data for separating the same into a plurality of color data and for outputting said color data by sending out data bits one after another for each of said color data in response to a clock pulse having the same frequency as that of said first sampling signal;
   (f) means for producing said first and second sampling signals, a signal for determining said switching frequency, and said clock pulse; and
   (g) a memory for storing said luminance digital data of a plurality of bits from said first analog-to-digital converter, and said chrominance digital data from said second switching circuit, each bit of said luminance digital data and said chrominance digital data being simultaneously written into said memory in response to said clock pulse.

2. A circuit arrangement as claimed in claim 1, wherein said first cut-off frequency is set to 0.5 MHz.

3. A circuit arrangement as claimed in claim 1, wherein said means comprises:
   (a) a decoder responsive to said color video signal for producing a luminance signal, and three color difference signals;
   (b) a matrix responsive to said luminance signal and said three color difference signals for outputting said luminance signal and three primary color signals;
   (c) a band-pass filter responsive to said luminance signal for producing said frequency-limited luminance signal; and
   (d) three low-pass filters respectively responsive to said three primary color signals for producing said three frequency-limited chrominance signals.

4. A circuit arrangement as claimed in claim 3, wherein said band-pass filter has a pass-band ranging from 0.5 MHz to approximately one half the sampling signal frequency fed to said first analog-to-digital converter.

5. A circuit arrangement as claimed in claim 1, wherein said second switching circuit comprises three shift registers of parallel-in and serial-out type.

6. A circuit arrangement as claimed in claim 1, wherein said first analog-to-digital converter is of "n" bits, while said second analog-to-digital converter is of "n+m" bits, wherein "n" and "m" are positive integers.

* * * * *